April 4, 1967    J. P. CONNER ETAL    3,312,122
MECHANICAL INTERLOCK
Filed May 25, 1964
Fig. 1.
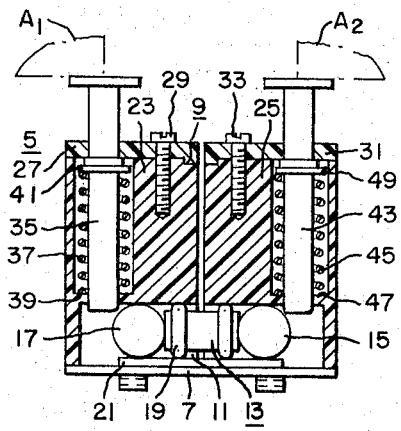
Fig. 2.
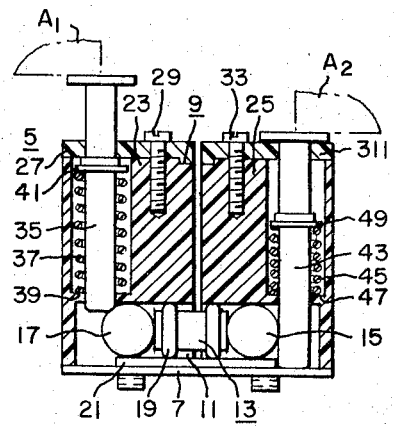
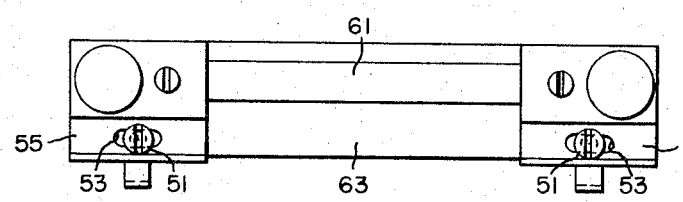
Fig. 3.
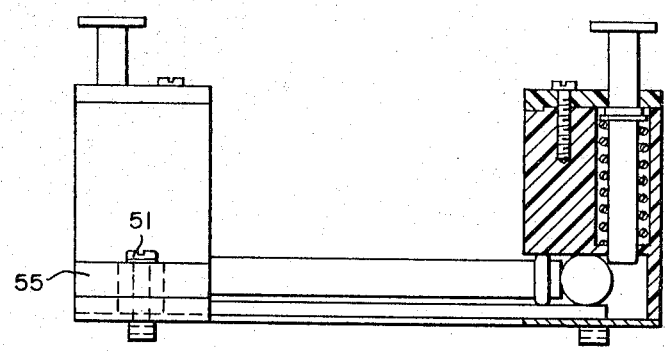
Fig. 4.
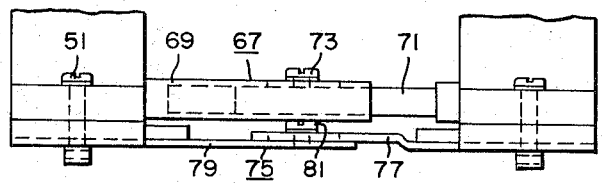
Fig. 5.

United States Patent Office 3,312,122
Patented Apr. 4, 1967

3,312,122
MECHANICAL INTERLOCK
John P. Conner, Brighton Township, and Stephen S. Dobrosielski, Beaver, Pa., assignors to Westinghouse Electric Corporation, East Pittsburgh Pa., a corporation of Pennsylvania
Filed May 25, 1964, Ser. No. 369,716
10 Claims. (Cl. 74—483)

This invention relates generally to mechanical interlocks and more particularly to mechanical interlocks of the type comprising means interlocking two actuating members to prevent the actuating members from being in particular positions at the same time.

For certain control operations, it is desirable to prevent the simultaneous operation of two separate actuating members. For example, in the electric control art, contactor structures are used for starting, stopping and reversing the direction of A.-C. squirrel cage motors, and for the primary control of reversing wound rotor motors. For these applications a mechanical interlock is generally mounted between a forward and a reverse contactor to prevent the closing of both contactors at the same time. It is desirable, in these and other applications, to provide a reliable interlock with means for adjusting the interlock to compensate for possible operating variations due to wear of parts. The adjustment feature also enables the manufacture of interlocks in quantity with means for adjusting the interlocks to make up for possible manufacturing variations. The adjustment feature also provides that the same interlock can be used in different applications where the dimension between the actuating members of the contactors or other actuating members may vary from one installation to another installation.

Thus, an object of this invention is to provide an improved adjustable mechanical interlock.

Another object of this invention is to provide an improved mechanical interlock that is constructed such that many of the same parts may be utilized in different interlock assemblies for different applications.

Another object of this invention is to provide an improved mechanical interlock that is adjustable over a wide range of adjustment to enable the utilization of the same interlock at different installations where the dimension between the actuating members may vary over the range of the interlock adjustment.

A further object of this invention is to provide an improved bearing-interference type mechanical interlock.

A general object of this invention is to provide an improved mechanical interlock that is reliable in operation, easy to assemble and relatively inexpensive to manufacture.

The invention, both as to construction and operation, together with additional objects and advantages thereof, will be best understood from the following detailed description when read in conjunction with the accompanying drawings, in which:

FIGURE 1 is a front sectional view of a mechanical interlock constructed in accordance with principles of this invention;

FIG. 2 is a sectional view similar to FIG. 1 with one of the operating members being shown in the actuated position;

FIG. 3 is a top plan view of a mechanical interlock similar to the interlock seen in FIG. 1 except that the interlock of FIG. 3 is constructed to provide an increased dimension between the operating members of the interlock;

FIG. 4 is a front view, with one of the housing parts being shown in section, of the mechanical interlock seen in FIG. 3; and FIG. 5 is a partial front view of a mechanical interlock illustrating another embodiment of the invention.

Referring to FIGS. 1 and 2 of the drawings, there is shown therein a mechanical interlock 5 comprising a base member 7 and a housing structure 9. The base member 7 and housing structure 9 cooperate to form a generally horizontal (FIG. 1) track 11. A blocking structure 13, comprising two ball bearings 15 and 17 and a spacer 19, is supported in the track 11 for limited reciprocal horizontal (FIG. 1) movement. The blocking structure 13 moves on a raised portion 21 of the base member 7. The housing structure 9 comprises two insulating housing parts 23 and 25 each of which housing parts is secured to the base 7 by means of a separate screw (not shown). The means for securing the housing parts 23 and 25 to the base 7 will be hereinafter more specifically described. An insulating cover 27 is secured to the housing part 23 by means of a screw 29. An insulating cover 31 is secured to the housing part 25 by means of a screw 33. The housing part 23 and cover 27 form one housing section and the housing part 25 and cover 31 form another housing section. An elongated operating member 35 is mounted generally within the housing section 23, 27 for rectilinear reciprocal vertical (FIG. 1) movement. As can be seen in FIGS. 1 and 2, the member 35 extends out through a suitable opening in the cover 27. A compression spring 37 engages shoulder 41 on the operating member 35 to bias the operating 35 to the upper unactuated position seen in FIG. 1. An operating member 43 is mounted in a suitable cavity in the housing section 25, 31. The member 43 protrudes out through a suitable opening in the cover 31. A compression spring 45 engages a shoulder 49 on the operating member 43 to bias the operating member 43 to the upper unactuated position seen in FIG. 1.

The dot-and-dash lines on the left in FIG. 1 represent part of an actuator $A_1$ that is disposed for vertical rectilinear reciprocal movement. The dot-and-dash lines on the right in FIG. 1 represent part of an actuator $A_2$ that is disposed for vertical rectilinear reciprocal movement. These actuators, the details of which are no part of the present invention, are shown and described more fully in the copending patent application of John P. Conner and Kurt A. Grunert, Ser. No. 369,715, filed May 25, 1964, and assigned to the assignee of the instant application. In the copending application, the actuators $A_1$ and $A_2$ are actuating members of separate electrical contactors.

If the actuating member $A_2$ alone is actuated to the lower operating position (FIG. 2), the operating member 43 will be depressed to the position seen in FIG. 2 during which movement the operating member 43 will engage the ball bearing 15 and move the blocking structure 13 laterally to the left whereupon the ball bearing 17 will engage the operating member 35 to thereby prevent depression of the operating member 35 and actuation of the actuating member $A_1$. Actuation of the actuating member $A_2$ charges the spring 45 so that upon movement of the actuating member $A_2$ back up to the unactuated position, the spring 45 will operate to move the operating member 43 back up to the position seen in FIG. 1. Thereafter, if either of the actuating members $A_1$ or $A_2$ is actuated, the associated operating member will be depressed to move the blocking structure 13 into engagement with the other operating member to thereby prevent operation of the other actuating member in the same manner as was hereinbefore described with reference to FIG. 2.

Referring to FIG. 1, it is to be noted that the length of the blocking structure 13 is such that if an attempt is made to simultaneously depress the operating members 35 and 43, the ball bearings 17 and 15 will engage the members 35 and 43 respectively to prevent movement of the members 35 and 43 to the lower operating position.

Thus, the interlock 5 provides that the operating members 35 and 43, and, therefore, the actuating members $A_1$ and $A_2$ cannot be in the lower operating positions at the same time.

The means for securing the housing sections 23, 27 and 25, 31 are the same as the securing means shown in FIGS. 3 and 4 so that this securing means will be described with relation to the parts seen in FIGS. 3 and 4. As can be seen in FIGS. 3 and 4, a separate screw member 51 passes through an elongated slot 53 in a lower portion 55 of each of the insulating housing parts 23 and 25. Each of these screws 51 is screwed into a tapped opening in the base member 7 (FIGS. 1 and 2) to secure the associated housing section to the base member 7. With the provision of the elongated slots 53, the screws 51 can be loosened and the housing sections 23, 27 and 25, 31 (FIGS. 1 and 2) can be moved laterally to thereby adjust the spacing between the separate housing sections to thereby adjust the spacing between the operating members 35, 43. Thereafter, the screws 51 can be tightened to secure the housing sections in the adjusted positions. It is to be understood that an adjustment can be made by merely moving one of the housing sections 23, 27 or 25, 31 to a different adjusted position. With the provision for moving both housing sections one half of the total adjusting movement can be made with each of the housing sections. Thus, in situations where it is desirable to keep the positions of the base 7 and actuators $A_1$, $A_2$ fixed, it will be less likely that the adjustment will move one of the operating members to a position where it will not be effectively operated by the associated actuating member. With the provision of the slot-and-screw securing means enabling relative movement of the separate housing sections on the base, the spacing between the operating members 35 and 43 can be varied in order to provide reliable operation if the parts should wear during operation and also to provide a slight adjustment to overcome manufacturing variations when the mechanical interlocks are manufactured in quantity.

Referring to FIGS. 3 and 4, a mechanical interlock 59 is shown therein which operates in the same manner as the mechanical interlock 5 disclosed in FIGS. 1 and 2. The only differences between the interlock 59 and the interlock 5 are that a spacing member 61 and base member 63 of the interlock 59 are longer than the spacing member 19 and base 7 of the interlock 5. Otherwise, the blocking structure 13 and the housing sections 23, 27 and 25, 31 are the same as those of FIGS. 1 and 2. Thus, the same reference characters are used in FIGS. 3 and 4 to identify these same parts. The showing of the two different interlocks 5 and 59 illustrates an advantage of applicants' invention in that with the provision of the separate housing sections, applicants need only change the spacing member and the base member in order to provide a different interlock that can be utilized to interlock actuating members that would be spaced further apart than the actuating members seen in FIGS. 1 and 2. Thus, it can be understood that many of the same parts of the mechanical interlock can be utilized to provide different mechanical interlocks for different applications.

Referring to FIG. 5, there is shown therein another embodiment of the invention. A mechanical interlock 65 disclosed in FIG. 5 is generally the same in construction as the interlock 59 of FIGS. 3 and 4 except that the spacing member 67 comprises two parts 69 and 71 that are telescoped together and held in an adjusted position by means of a set screw 73, and the base member 75 comprises two parts 77 and 79 that are telescoped together and held in an adjusted position by means of a set screw 81. Another modification of the interlocks 65 disclosed in FIG. 5 is that each of the set screws 51 passes through a narrow opening in the associated housing part because the adjustment feature is taken care of in this embodiment by means of the two telescoping structures 67 and 75. With the provision of a telescoping spacing member 67 and telescoping base 75, the relative positions of the housing sections can be varied, and the same base member and same spacing member can be adjusted lengthwise to support the adjusted housing sections and to provide the hereinbefore described interlocking function. Thus, the interlock 65 shown in FIG. 5 has a wide range of adjustability. Manufacturers and suppliers of the mechanical interlocks 65 need only manufacture and supply the one interlock for applications wherein it can be anticipated that the dimension between the actuating members that are to be interlocked may vary to the extent of the adjustability of the interlock.

Since numerous changes may be made in the above-described construction and different embodiments of the invention may be made without departing from the spirit and scope thereof, it is intended that all matter contained in the description or shown in the accompanying drawings shall be interpreted as illustrative and not in a limiting sense.

We claim as our invention:

1. A mechanical interlock comprising a base, a housing structure supported on said base and comprising a first housing section, a first operating member supported on said first housing section and movable between first and second operating positions, a second housing section, a second operating member supported on said second housing section and movable between first and second operating positions, track means between said first and second operating members, an elongated blocking structure supported on said track means for lengthwise back and forth movement, said elongated blocking structure operating automatically to prevent said operating members from being in their respective second positions at the same time, and means for adjusting the length of said elongated blocking structure to adjust said blocking operation of said elongated blocking structure.

2. A mechanical interlock comprising a base, a housing structure supported on said base and comprising a first housing section, a first operating member supported on said first housing section and movable between first and second operating positions, a second housing section, a second operating member supported on said second housing section and movable between first and second operating positions, track means between said first and second operating members, a blocking structure movably supported on said track means, said blocking structure operating automatically to prevent said operating members from being in their respective second positions at the same time, and means for moving one of said housing sections on said base to adjust the dimension between said operating members to thereby adjust said blocking operation.

3. A mechanical interlock comprising a base, a housing structure supported on said base and comprising a first housing section, a first operating member supported on said first housing section and movable between said first and second operating positions, a second housing section, a second operating member supported on said second housing section and movable between first and second operating positions, track means on said base between said first and second operating members, a blocking structure supported on said track means and comprising a first ball bearing disposed in proximity to said first operating member and a second ball bearing disposed in proximity to said second operating member, said blocking structure operating automatically to provide interference between said ball bearings and said operating members to prevent said operating members from being in their respective second positions at the same time, and means for moving one of said housing sections relative to the other housing section to adjust the dimension between said first and second operating members to thereby adjust said operation of said blocking structure.

4. A mechanical interlock comprising a base, a housing structure supported on said base and comprising a first housing section, a first operating member supported on said first housing section and movable between first and second operating positions, a second housing section, a second operating member supported on said second housing section and movable between first and second operating positions, track means on said base between said first and second operating members, an elongated blocking structure movably supported on said track means, said blocking structure operating automatically to prevent said operating members from being in their respective second positions at the same time, means for moving one of said housing sections on said base to adjust the distance between said housing sections to thereby adjust the distance between said operating members, and means for adjusting said blocking structure by varying the length of said blocking structure to thereby provide that after the distance between said housing sections is adjusted said adjusted blocking structure will operate automatically to prevent said operating members from being in their respective second positions at the same time.

5. A mechanical interlock comprising a base, a housing structure supported on said base and comprising a first housing section, a first operating member supported on said first housing section and movable between first and second operating positions, a second housing section, a second operating member supported on said second housing section and movable between first and second operating positions, track means on said base between said first and second operating members, a blocking structure movably supported on said track means, said blocking structure operating automatically to prevent said operating members from being in their respective second positions at the same time, and means for varying the dimension of said base and said blocking structure to thereby vary the dimension between said operating members while maintaining said blocking operation.

6. A mechanical interlock comprising a base, a housing structure supported on said base and comprising a first housing section, a first operating member supported on said first housing section and movable between first and second operating positions, a second housing section, a second operating member supported on said second housing section and movable between first and second operating positions, track means on said base between said first and second operating members, a blocking structure comprising a first ball bearing disposed in proximity to said first operating member and a second ball bearing disposed in proximity to said second operating member, said blocking structure comprising an elongated spacer disposed between said first and second ball bearings, said blocking structure operating automatically to provide interference between said ball bearings and said operating members to thereby prevent said operating members from being in their respective second positions at the same time, and said spacer and said base comprising adjustable telescoping members whereby the dimension between said operating members can be varied while said blocking operation is maintained.

7. A mechanical interlock comprising a first operating member and a second operating member spaced from said operating member, each of said operating members being movable between a first and a second position, housing means forming a track, a blocking structure movable on said track, said blocking structure comprising a first ball bearing and a second ball bearing, upon movement of said first operating member to the second position said first operating member engaging said first ball bearing and moving said blocking structure to a position wherein said second ball bearing engages said second operating member to prevent movement of said second operating member to the second position, upon movement of said first operating member to the first position and thereafter movement of said second operating member to the second position said second operating member engaging said second ball bearing and moving said blocking structure to a position wherein said first ball bearing engages said first operating member to prevent movement of said first operating member to the second position, and means for adjusting the dimension between said first and second operating members.

8. A mechanical interlock comprising a first operating member and a second operating member spaced from said first operating member, each of said operating members being movable between a first and a second position, housing means forming a track, a blocking structure movable on said track, said blocking structure comprising a first ball bearing and a second ball bearing, said blocking structure comprising a spacing member disposed between said first and second ball bearings, upon movement of said first operating member to the second position said first operating member engaging said first ball bearing and moving said blocking structure to a position wherein said second ball bearing engages said second operating member to prevent movement of said second operating member to the second position, upon movement of said first operating member to the first position and thereafter movement of said second operating member to the second position said second operating member engaging said second ball bearing and moving said blocking structure to a position wherein said first ball bearing engages said first operating member to prevent movement of said first operating member to the second position, upon simultaneous movement of said first and second operating members toward their second positions said first and second ball bearings engaging said first and second operating members respectively to prevent simultaneous movement of said first and second operating members to their second positions, and means for adjusting the dimension between said first and second operating members.

9. A mechanical interlock comprising a base, a first housing section supported on said base, means for adjusting the supported position of said first housing section on said base, a first operating member supported on said first housing section for rectilinear vertical movement, said first operating member protruding out from said first housing section, spring means biasing said first housing member to an upper first operating position, a second housing section supported on said base, means for adjusting the supported position of said second housing section on said base, a second operating member supported on said second housing section for rectilinear vertical movement, said second operating member protruding out from said second housing section, spring means biasing said second operating member to an upper first operating position, a track on said base, a blocking structure movable horizontally on said track, said blocking structure comprising a first ball bearing disposed in proximity to the lower end of said first operating member and a second ball bearing disposed in proximity to the lower end of said second operating member, said blocking structure comprising a spacing member disposed between said first and second ball bearings, upon depression of said first operating member to a lower second operating position against the bias of said first spring means said first operating member engaging said first ball bearing and moving said blocking structure to a position wherein said second ball bearing engages the lower end of said second operating member to prevent depression of said second operating member to a lower second operating position, upon release of said first operating member said first spring means operating to move said first operating member to said upper operating position and thereafter upon movement of said second operating member to the lower second operating position said second operating member engaging said second ball bearing and moving said blocking structure to a position wherein said first ball bearing engages said first operating member to prevent movement of said first operating member to the lower second operating position.

10. A mechanical interlock comprising a base, a first housing section supported on said base, a first operating member supported on said first housing section for rectilinear vertical movement, said first operating member protruding out from said first housing section, spring means biasing said first operating member to an upper first operating position, a second housing section supported on said base, a second operating member supported on said second housing section for rectilinear vertical movement, said second operating member protruding out from said second housing section, spring means biasing said second operating member to an upper first operating position, a track on said base, a blocking structure movable horizontally on said track, said blocking structure comprising a first ball bearing disposed in proximity to the lower end of said first operating member and a second ball bearing disposed in proximity to the lower end of said second operating member, said blocking structure comprising a spacing member disposed between said first and second ball bearings, upon depression of said first operating member to a lower second operating position against the bias of said first spring means, said first operating member engaging said first ball bearing and moving said blocking structure to a position wherein said second ball bearing engages the lower end of said second operating member to prevent depression of said second operating member to a lower second operating position, upon release of said first operating member said first spring means operating to move said first operating member to said upper operating position and thereafter upon movement said second operating member to the lower second operating position said second operating member engaging said second ball bearing and moving said blocking structure to a position wherein said first ball bearing engages said first operating member to prevent movement of said first operating member to the lower second operating position, and means for adjusting the dimension between said first and second operating members.

References Cited by the Examiner

UNITED STATES PATENTS

| 1,809,778 | 6/1931 | Evans | 74—483 |
| 2,451,150 | 10/1948 | Brian | 74—483 |
| 2,995,951 | 8/1961 | Evans | 74—483 |

FOREIGN PATENTS 167,637  8/1921  Great Britain.

MILTON KAUFMAN, *Primary Examiner.*